US007136072B2

(12) United States Patent
Ritter

(10) Patent No.: US 7,136,072 B2
(45) Date of Patent: Nov. 14, 2006

(54) SYSTEM AND METHOD FOR PERFORMING TEXTURE SYNTHESIS

(75) Inventor: Bradford A. Ritter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 09/921,464

(22) Filed: Aug. 3, 2001

(65) Prior Publication Data

US 2003/0206176 A1 Nov. 6, 2003

(51) Int. Cl.
*G09G 5/00* (2006.01)

(52) U.S. Cl. ...................................... 345/588

(58) Field of Classification Search ............... 345/582, 345/586, 584, 588
See application file for complete search history.

(56) References Cited

U.S. PATENT DOCUMENTS

| 4,601,055 | A  | * | 7/1986  | Kent ........................... 382/303 |
| 5,561,756 | A  | * | 10/1996 | Miller et al. ................. 345/848 |
| 6,011,557 | A  | * | 1/2000  | Keskes et al. ............... 345/582 |
| 6,232,981 | B1 | * | 5/2001  | Gossett ........................ 345/582 |
| 6,515,674 | B1 | * | 2/2003  | Gelb et al. ................... 345/582 |
| 6,583,790 | B1 | * | 6/2003  | Wolters ....................... 345/584 |
| 6,593,933 | B1 | * | 7/2003  | Xu et al. ..................... 345/586 |
| 2002/0122043 | A1 | * | 9/2002 | Freeman et al. ............. 345/582 |

OTHER PUBLICATIONS

"Real-time texture synthesis by patch-based sampling" Liang et al, ACM Transactions on Graphics (TOG) Jul. 2001, vol. 20 Issue 3, p. 127-150.*

"Pyramid-based texture analysis/synthesis", Heeger et al, Proceedings of the 22nd annual conference on Computer graphics and interactive techniques Sep. 1995, p. 229-238.*

"Fast Texture Synthesis using Tree-structured Vector Quantization", by Li-Yi Wei and Marc Levoy, Stanford University, SIGGRAPH 2000 Conference Proceedings, pp. 479-488.

"Vector Quantization and Signal Compression", by Allen Gersho and Robert Gray, Kluwer Academic Publishers, pp. 309-340, 345-356, 407-427 and 451-459.

U.S. Appl. No. 09/528,700 Apparatus for and Method of Rendering 3D Objects With Parametric Texture Maps.

U.S. Appl. No. 09/921,681 System and Method for Rendering Digital Images Having Surface Reflectance Properties, filed Aug. 3, 2001.

U.S. Appl. No. 09/921,477 System and Method for Rendering a Texture Map Utilizing an Illumination Modulation Value, filed Aug. 3, 2001.

U.S. Appl. No. 09/921,476 System and Method for Synthesis of Parametric Texture Map Textures, filed Aug. 3, 2001.

* cited by examiner

*Primary Examiner*—Ryan Yang

(57) ABSTRACT

In one embodiment, a method for synthesizing a texture of a desired size from a sample texture is provided. The method comprises the steps of generating a matrix of the desired size, and providing values to the matrix. The values include random values and at least a portion of the values represents a desired structure according to which graphical features of a synthesized texture are to substantially conform. The method further comprises executing a texture synthesis process that utilizes the matrix to generate a synthesized texture of the desired size having graphical features arranged therein substantially in conformance with the desired structure.

31 Claims, 6 Drawing Sheets

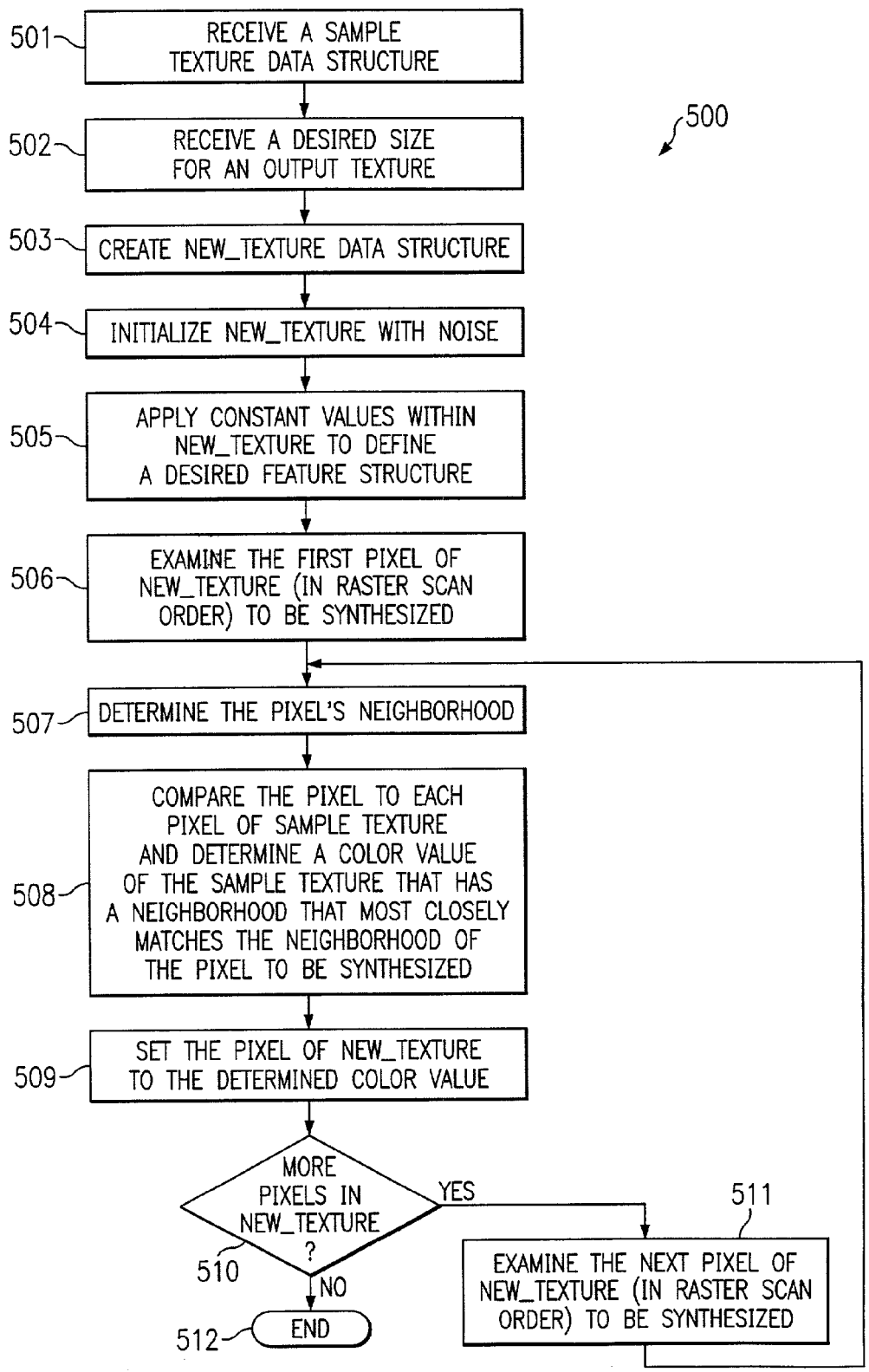

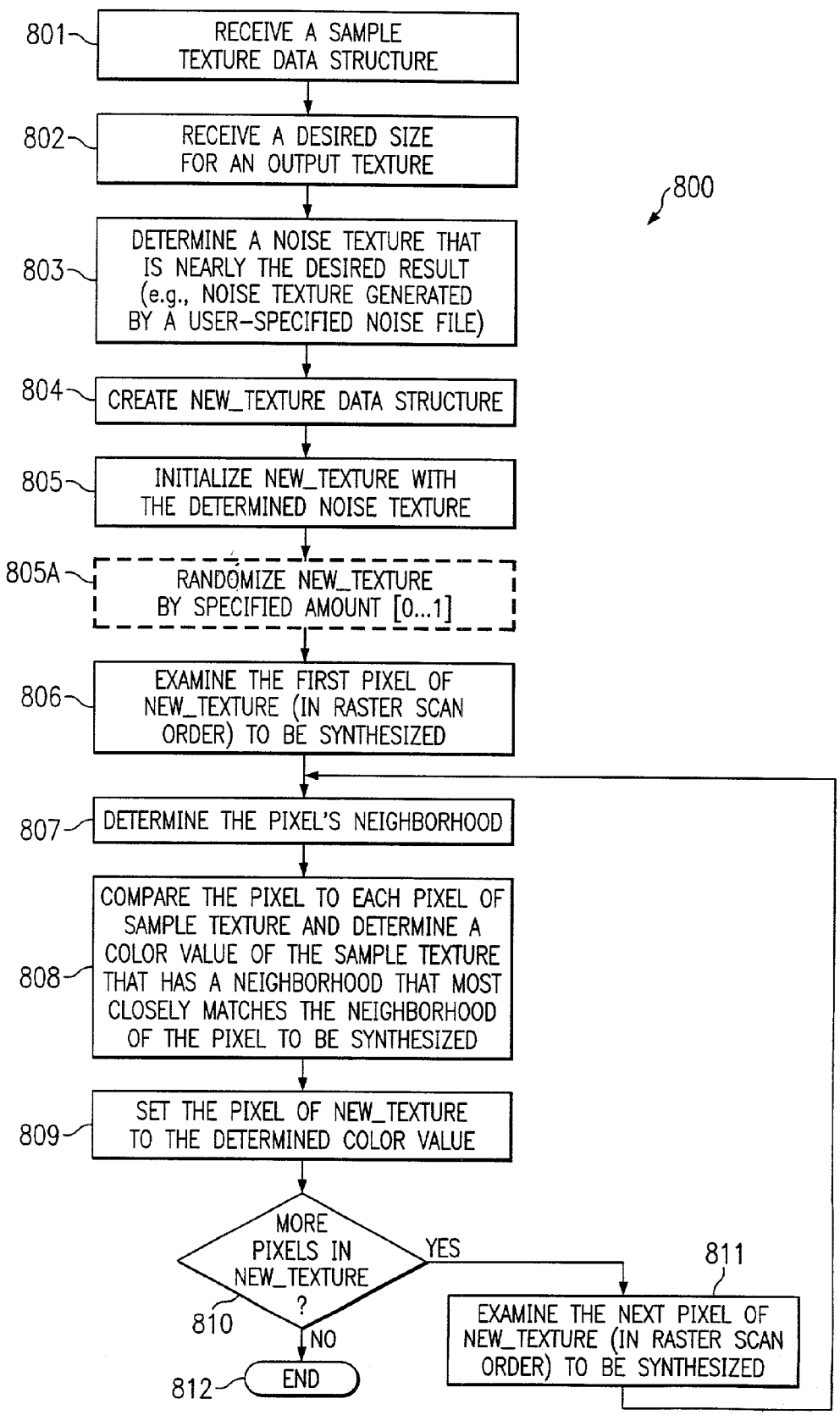

SYSTEM AND METHOD FOR PERFORMING TEXTURE SYNTHESIS

CROSS-REFERENCE TO RELATED APPLICATIONS

The present invention is related to co-pending and commonly assigned U.S. patent application Ser. No. 09/528,700 filed Mar. 17, 2000, entitled "APPARATUS FOR AND METHOD OF RENDERING 3D OBJECTS WITH PARAMETRIC TEXTURE MAPS," concurrently filed and commonly assigned U.S. patent application Ser. No. 09/921,477 entitled "SYSTEM AND METHOD FOR RENDERING A TEXTURE MAP UTILIZING AN ILLUMINATION MODULATION VALUE," concurrently filed and commonly assigned U.S. patent application Ser. No. 09/921,681, entitled "SYSTEM AND METHOD FOR RENDERING DIGITAL IMAGES WITH SURFACE REFLECTANCE PROPERTIES," and concurrently filed and commonly assigned U.S. patent application Ser. No. 09/921,476, entitled "SYSTEM AND METHOD FOR SYNTHESIS OF PARAMETRIC TEXTURE MAP TEXTURES," the disclosures of which are hereby incorporated herein by reference.

BACKGROUND OF THE INVENTION

1. Technical Field

The present invention is related to computer graphics, and more particularly to a system and method for synthesizing a texture from a sample texture.

2. Background

Various techniques have been utilized to render graphical images via computer systems. One representation of visual images is referred to as a texture. A texture refers to a graphics data structure which models the surface appearance of an object. A texture may represent the visual experience of many materials and substances (e.g., terrain, plants, minerals, fur, and skin). Textures may be created digitally by sampling a physical surface utilizing photographic techniques. Alternatively, textures may be created manually utilizing a suitable graphics design application.

Texture synthesis refers to creating a new texture of a selected size from a sample texture of a fixed size. For example, FIG. 1A depicts exemplary texture 101. Texture 101 includes a distribution of diamonds and stars. Although the diamonds and stars appear to be distributed in a semblance of order, a degree of randomization is apparent. The diamonds and stars seem to be arranged according to a stochastic process. FIG. 1B depicts exemplary synthesized texture 102. Synthesized texture 102 is not merely an enlarged or upscaled version of texture 101. Synthesized texture 102 possesses approximately the same degree of detail per unit of area as texture 101. The distribution of diamonds and stars in synthesized texture 102 does not exactly correspond to the distribution in texture 101. However, it appears that the same stochastic process has generated the distribution of synthesized texture 102.

Synthesizing a new texture that appears to an observer to have been generated from the same stochastic process can be quite challenging. In particular, interpolation techniques (such as Fourier coefficient algorithms) are not helpful because the level of visual detail as a function of area is not maintained in the larger synthesized texture. Moreover, boundary conditions present a number of difficulties. In particular, seams and repetitions may be visually evident, thereby reducing the realism of the synthesized texture.

A texture synthesis algorithm has been developed by Li-Yi Wei and Marc Levoy which addresses the preceding texture synthesis issues. The algorithm is described in *Fast Texture Synthesis Using Tree-Structured Vector Quantization,* Li-Yi Wei and Marc Levoy, SIGGRAPH 2000 Conference Proceedings, pg. 479–488, the disclosure of which is hereby incorporated herein by reference. The algorithm begins by utilizing a texture of a given size to generate a texture of some arbitrary larger size. Wei and Levoy describe (a) modeling or estimating the stochastic process associated with the original texture and (b) sampling from the original texture to synthesize or produce the new texture having the larger size. At a high level, the algorithm synthesizes the new texture by modeling the original texture using Markov Random Field concepts. The algorithm assembles the new texture in a pixel by pixel manner. Each pixel of the new matrix is determined by comparing its "neighborhood" to all neighborhoods in the original matrix.

Specifically, the synthesis algorithm taught by Wei and Levoy begins by receiving a data structure defining a texture. The data structure is a matrix of red-green-blue (RGB) values defining the texture, where RGB is a well-known encoding method for representing the red, green, and blue chromatic channels of a pixel. A second matrix is created that is equal in size to the desired size of the texture to be synthesized. The second matrix is initialized with white random noise.

The algorithm proceeds by examining each pixel of the second matrix in raster scan order (e.g., from left to right and top to bottom). The algorithm transforms each pixel by first determining the neighborhood of each pixel. The neighborhood refers to a group of pixels that are relatively adjacent to the respective pixel of the second matrix. Also, the neighborhood is preferably chosen to be causal. Specifically, it is selected so that it only contains pixels that have already been synthesized and not pixels containing noise values. For example, FIG. 1C depicts exemplary matrix 103. Matrix 103 comprises pixel 104 and exemplary neighborhood 105. Neighborhood 105 only contains pixels that are previous to pixel 104 in the raster scan order. It shall be appreciated that this is not always possible. Accordingly, the first few pixels are allowed to contain neighborhoods with noise values. However, after a number of pixels have been synthesized, it is preferred to only utilize causal neighborhoods. Also, when a pixel is selected that is close to an edge of the matrix, the neighborhood may be selected in a toroidal manner, i.e., the neighborhood wraps around to the other side of the matrix.

The value of each respective pixel is assigned by comparing it to each pixel in the original matrix. Specifically, each pixel of the second matrix is assigned the color of the pixel in the original matrix that possesses a neighborhood that most closely matches the respective neighborhood of the pixel to be synthesized. The determination of most-closely matching neighborhoods is performed by utilizing a simple norm (sum of square differences) calculation. For example, $R_1$, $G_1$, $B_1$ may represent the red, green, and blue components or channels of a pixel in a neighborhood of the original or sample texture. $R_2$, $G_2$, $B_2$ may represent the red, green, and blue components or channels of a corresponding pixel in a neighborhood of the texture to be synthesized. The square of the difference equals $(R_1-R_2)^2+(G_1-G_2)^2+(B_1-B_2)^2$. The sum of the differences then equals the summation of the previous calculation for each pixel pair between the two neighborhoods. The lowest norm corresponds to the most closely matching neighborhood.

Wei and Levoy also describe optimizations to the algorithm. First, multi-resolution synthesis is described to adapt to larger sized neighborhoods. The multi-resolution synthesis operates by building Gaussian pyramids from the original matrix and the noise matrix. A Gaussian pyramid is a hierarchy of low-pass filtered versions of the original image, such that successive levels correspond to lower frequencies. The Gaussian pyramid is produced by low-pass filtering via convolution with a Gaussian filter kernel. The algorithm proceeds by transforming the noise Gaussian pyramid from lower to higher resolutions. The only modification for the multi-resolution case is that each neighborhood contains pixels in the current resolution and all lower resolutions.

Wei and Levoy further describe acceleration of the algorithm utilizing tree-structured vector quantization (TSVQ). As described in *Vector Quantization and Signal Compression*, A. Gersho and R. M. Gray (1992), the disclosure of which is hereby incorporated herein by reference, TSVQ is a well-known technique for data compression. The tree generated by TSVQ may be used as a data structure for efficient nearest-point queries. To find the nearest point of a given query vector, the tree is traversed from the root in a best-first ordering by comparing the query vector with the two children codewords and then following the one that has a closer codeword. This process is repeated for each visited node until a leaf node is reached. The best codeword is then returned as the codeword of that leaf node. Unlike full searching, the result codeword may not be the best or closest one, since only part of the tree is traversed. However, the result codeword usually approximates the exact solution, and the computation is more efficient than full searching.

To use TSVQ in the synthesis algorithm, the set of neighborhood pixels are collected for each input pixel and treated as a vector of a size equal to the number of pixels in the neighborhood. The vectors for each neighborhood are used as the training data to generate the corresponding tree structure codewords. During the synthesis process, the (approximate) closest point neighborhood is found by performing a best-first traversal of the binary-tree structure.

BRIEF SUMMARY OF THE INVENTION

In one embodiment, a method for synthesizing a texture of a desired size from a sample texture is provided. The method comprises the steps of generating a matrix of the desired size, and providing values to the matrix. The values include random values and at least a portion of the values represents a desired structure according to which graphical features of a synthesized texture are to substantially conform. The method further comprises executing a texture synthesis process that utilizes the matrix to generate a synthesized texture of the desired size having graphical features arranged therein substantially in conformance with the desired structure.

BRIEF DESCRIPTION OF THE DRAWINGS

FIG. 5 depicts an exemplary operational flow diagram for an implementation of a texture synthesis process in accordance with one embodiment of the present invention.

FIG. 8 depicts an exemplary operational flow diagram for an implementation of a texture synthesis process in accordance with one embodiment of the present invention.

DETAILED DESCRIPTION OF THE INVENTION

By utilizing the preceding techniques described by Wei and Levoy, texture synthesis may generally be performed with appreciable quality. Specifically, textures of significant size may be produced from relatively small sample textures. Moreover, the subjective visual quality of the synthesized textures generally remains comparable to the original samples.

However, the algorithm described by Wei and Levoy contains certain limitations, particularly when used for synthesizing sample textures having highly structured features (e.g., features arranged therein according to a geometric structure). For example, if a sample texture has features that occur as a repeating geometric structure, the algorithm described by Wei and Levoy generally produces a result that does not maintain such repeating geometric structure. Thus, while the Wei and Levoy algorithm is faster and provides improved quality over other Markov Random Field methods, such algorithm fails to maintain graphical features arranged in accordance with a desired structure.

Figure 1A:
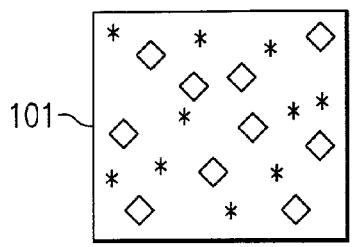
FIG. 1A depicts an exemplary prior art texture.
Figure 1B:
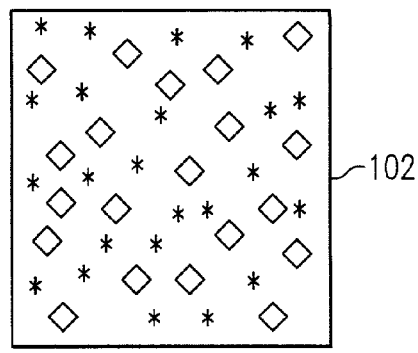
FIG. 1B depicts an exemplary prior art texture synthesized from the texture depicted in FIG. 1A.
Figure 1C:
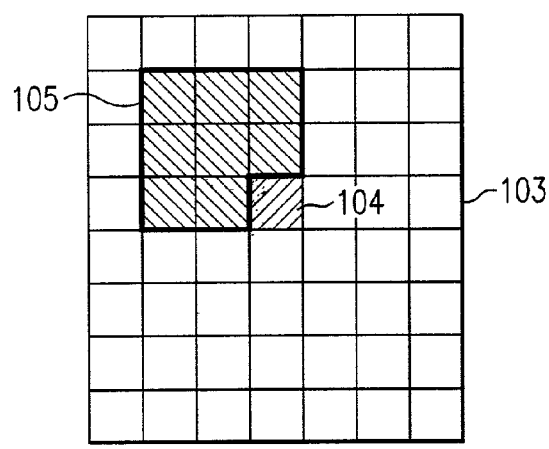
FIG. 1C depicts an exemplary matrix with a selected pixel and a causal neighborhood according to the prior art.
Figure 2:
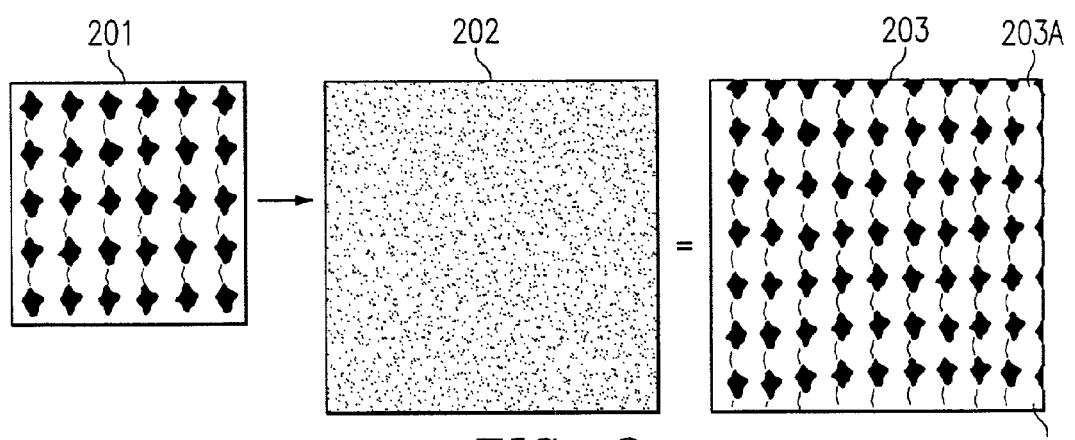
FIG. 2 depicts a prior art example of a sample texture that has features that occur as a repeating geometric structure, and a corresponding prior art synthesized texture that does not accurately maintain such repeating geometric structure.

A relatively simple example to illustrate this point is illustrated in FIG. 2. As shown in FIG. 2, an exemplary sample texture 201 may be input to the algorithm along with random noise texture 202 to produce synthesized texture 203. In this example, sample texture 201 includes graphical features (e.g., diamonds) that are arranged according to a repeating structure that appears to be substantially geometric, while still possessing some stochastic attributes. While the arrangement of the diamonds is not truly a geometric pattern (as such a pattern would not appear authentic/realistic), the diamonds are arranged in accordance with an underlying geometric structure (e.g., of rows and columns). Accordingly, as used herein, an underlying structure is intended to encompass an inexact structure according to which graphical features may be arranged within a texture, which possess a degree of stochastic attributes. For example, a graphical image of a fabric having diamonds arranged thereon may not appear to be authentic if it were synthesized to produce a true geometric pattern of diamonds thereon. However, the diamonds of texture 201 have a semblance of being arranged in accordance with an underlying defined structure (e.g., geometric pattern), which it may be desirable to maintain in a resulting synthesized texture. Accordingly, when referring to maintaining graphical features arranged in accordance with a defined structure in a synthesized structure, it should be recognized that it may be desirable to maintain graphical features arranged having a semblance of an underlying structure to such arrangement, while possessing certain stochastic attributes.

In the example of FIG. 2, the diamonds of sample texture 201 appear arranged according to an underlying structured pattern of rows and columns, wherein the diamonds are substantially aligned in a symmetrical manner within a repeating pattern of rows and columns. Such a texture having features that are arranged according to an underlying geometric structure are commonly found in fabrics, for example, which often have a pattern of features arranged therein according to such an underlying geometric structure. It should be noted that the synthesized texture 203 does not maintain the diamonds arranged in accordance with the underlying structured pattern of rows and columns of sample texture 201 very well. For instance, the top row 203A of resulting synthesized texture 203 is slanted and the bottom row 203B of texture 203 is arched, rather than providing the diamonds in substantially straight rows in accordance with the underlying structure of sample texture 201.

The underlying structure of sample texture 201 is not maintained in resulting synthesized texture 203 because of the randomness in the intermediary noise texture 202 used in synthesizing texture 203. In fact, the disturbance in the feature structure of sample texture 201 in resulting synthesized texture 203 is relatively minor compared to the disturbance of a feature structure that is often encountered through use of a synthesis algorithm, such as the Wei and Levoy algorithm. In fact, in many cases the underlying feature structure provided in a sample texture is not maintained at all in the resulting synthesized texture, but rather the feature (e.g., diamond) may occur in a very random/arbitrary way in the resulting synthesized texture.

The importance of randomness in a texture synthesis process is commonly stressed. For example, some randomness in the synthesis process is generally desired to enable a resulting texture that is tileable to be achieved. For instance, if the initial noise texture is not random enough, the resulting synthesized texture may include a very recognizable feature, which may in turn make the individual tiles within the resulting synthesized texture recognizable. However, when synthesizing sample textures having highly structured features (i.e., features that appear to be arranged according to an underlying structure), it is also desirable to provide a synthesis process that enables such structured features to be maintained in the resulting synthesized texture. That is, it is often desirable to temper the randomness of the synthesis process such that structured features of a sample texture are maintained in the resulting synthesized texture.

Embodiments of the present invention provide a texture synthesis technique that enables a sample texture having graphical features arranged according to an underlying structure to be synthesized to produce a synthesized texture that includes such structured features. Thus, for instance, a sample texture that includes graphical features, such as diamonds and/or stars, arranged according to an underlying structure (e.g., according to an underlying geometric pattern) may be synthesized to produce a synthesized texture of any desired size. Further, embodiments of the present invention enable the texture synthesis process to generate a synthesized texture that maintains the arrangement of such graphical features according to the underlying structure as in the sample texture.

In general, the randomness present in a texture synthesis process, such as the process of Wei and Levoy, is a desirable feature in that it enables a resulting synthesized texture that is tileable. If too much structure is forced upon the synthesis process, the tiling characteristics of the resulting synthesized texture may suffer. Thus, embodiments of the present invention balance the randomness and graphical feature structure within a synthesis process to enable a synthesized texture to be generated that is tileable, while also maintaining an arrangement of graphical features in accordance with a defined geometric structure within the synthesized texture.

In comparing a texture synthesized according to at least one embodiment of the present invention to a sample texture from which it was synthesized, it appears that the same stochastic process as used in the sample texture is used to generate the distribution of the resulting synthesized texture. However, the randomness present in the resulting synthesized texture is preferably limited to a degree to allow a desired arrangement of graphical features (e.g., an arrangement according to an underlying geometric structure) present in the sample texture to be maintained in the synthesized texture. Thus, according to embodiments of the present invention the randomness of a noise texture is tempered in a manner to enable a desired structure of graphical features appearing in the sample texture to be maintained in the resulting synthesized texture.

In one embodiment, constant values are preferably included within an intermediate noise texture used in synthesizing a texture to aid in maintaining a desired structure of graphical features. For instance, constant values may be included within the noise texture to specify an underlying geometric structure according to which graphical features are to be arranged. The constant values are used to identify the underlying geometric structure of graphical features that is desired to be maintained in the resulting synthesized texture. For example, a grid of constant values may be applied within the noise texture, which may specify a row and column configuration to be utilized in arranging graphical features (e.g., diamonds or other graphical objects) of the sample texture within the resulting synthesized texture. According to another embodiment, the noise texture is modified or substituted with a texture that is very nearly the desired result, but that lacks sufficiently tileable characteristics. Thus, the synthesis process utilizing such a noise texture may more accurately synthesize the sample texture. For instance, the synthesis process may create/utilize a noise texture in accordance with embodiments of the present invention to generate a synthesized texture having tileable characteristics, while maintaining the desired structure of graphical features, as defined in the sample texture.

A preferred embodiment of the present invention is implemented with parametric texture mapping ("PTM") textures. However, the present invention is not limited to PTM textures. Rather, any texture mapping format now known or later discovered may be utilized in various embodiments of the present invention. Embodiments of the present invention provide a texture synthesis process that utilizes a neighborhood comparison approach, similar to that of Wei and Levoy. However, other texture synthesis processes now known or later discovered that utilize a neighborhood comparison approach may be implemented with embodiments of the present invention. That is, embodiments of the present invention may be implemented within other texture synthesis processes to control the randomness of the arrangement of graphical features in a resulting synthesized texture as desired. Thus, any suitable texture synthesis process using a neighborhood comparison approach may be implemented with one or more embodiments of the present invention utilized therein to enable a desired arrangement of graphical features within a sample texture to be maintained within a resulting synthesized texture.

Preferred embodiments of the present invention provide systems and methods for synthesizing a PTM texture. In general, PTM is a computer algorithm for rendering objects using a two-dimensional representation of light. PTM is often desirable because it produces quite realistic images based on material properties while employing reasonable computational complexity. Additionally, it shall be appreciated that the PTM algorithm is capable of producing appreciably greater realism for graphical images than many other graphical rendering techniques, such as those employing RGB encoding techniques and bump mapping.

In texture maps, such as PTMs, a texture may be represented as a matrix of discrete components called "texels," which refer to texture elements. Texels may be understood as being analogous to pixels. In a traditional RGB texture, a texel is an RGB component. In PTM, texels generally are more complex data structures which contain lighting information. The lighting information may be used to reconstruct the surface color under varying light conditions. By encoding lighting information in this manner, PTM textures may permit perception of surface deformations. Additionally, PTM textures may permit perception of self-shadowing and interreflections. PTM textures may also simulate other optical effects such as anisotropic and Frensel shading models.

Generally, in PTM, each texel is defined by a biquadric function with six coefficients. Each texel is represented by the following form:

$$PTM(u,v)=Au^2+Bv^2+Cuv+Du+Ev+F,$$

where u and v represent scalar quantities associated with orthogonal components of a vector in a plane. For example, u and v may represent the intensity of light from two different directions where the texel is rendered on a three-dimensional object or model. Specifically, a light source is first determined to be illuminating the texture which, for example, may be wrapped on the three-dimensional object. The light source is defined as being positioned at a location relative to the texel being illuminated in the direction defined by illumination vector, L. Illumination vector, L, is typically a unit vector. Secondly, surface normal vector, S, is determined (which is also typically a unit vector). The projection of illumination vector, L, onto the plane defined by surface normal vector, S, is determined. The projection may be represented as two orthogonal vector components on the plane defined by surface normal vector, S. The two orthogonal vector components are respectively associated with the scalar values, u and v.

Figure 3:
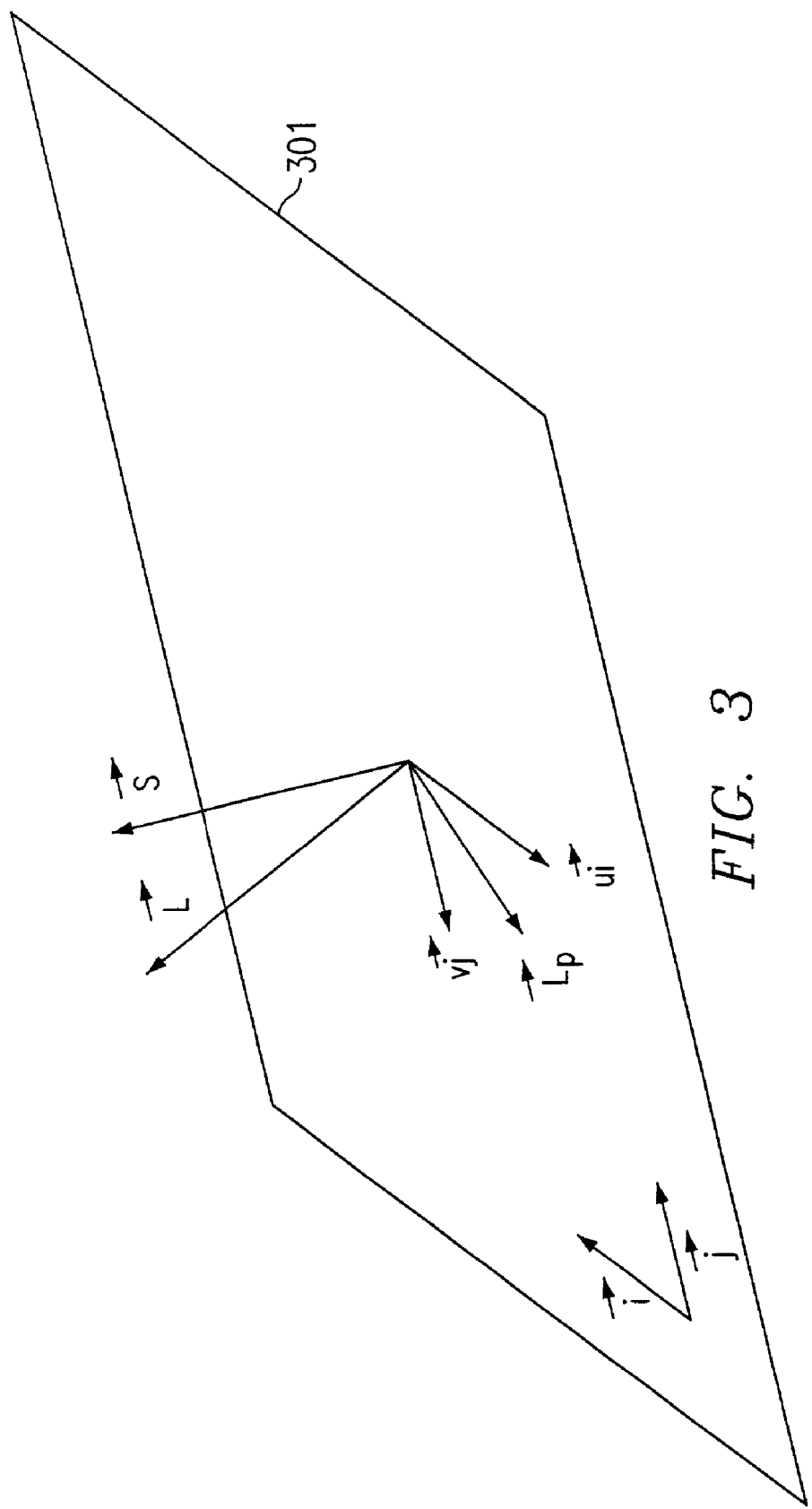
FIG. 3 depicts an exemplary plane, surface normal vector, and illumination vector utilized in parametric texture mapping (PTM) according to a preferred embodiment of the present invention.

To aid the reader's understanding of the PTM vector concepts, reference is now made to FIG. 3 which depicts exemplary plane 301 associated with a texel, surface normal vector, S, and illumination vector, L. As is well-known in the art, plane 301 is defined by a position and surface normal vector, S. The unit vectors i and j are mutually orthogonal on plane 301. Unit vectors i and j are also orthogonal to surface normal vector, S, by definition. $L_p$ is the projection of illumination vector, L, onto plane 301. $L_p$ is composed of components (ui, vj), where u and v are the scalar values of $L_p$ in the i and j directions, respectively.

The coefficients of the texel representation equation, A–F, of the PTM texture function described above may be determined by repeatedly sampling a surface. For example, a physical stone surface may be digitally photographed a number of times utilizing different illumination angles. The coefficients, A–F, may then be determined from the digital information utilizing a least square approximation. Singular value decomposition (SVD) may be utilized to perform this analysis. Further details regarding implementation of PTM algorithms are disclosed in U.S. patent application Ser. No. 09/528,700, entitled "APPARATUS FOR AND METHOD OF RENDERING 3D OBJECTS WITH PARAMETRIC TEXTURE MAPS."

In some embodiments of the present invention, the PTM function defines the brightness of a texel and the chromaticity is held constant, i.e., a single PTM function is utilized for all of the red, green, and blue (RGB) chromatic components or channels. It shall be appreciated, however, that in other implementations separate functions may be defined for red, green, and blue (RGB) chromatic components or channels. The separate functions may be used to calculate gray-level intensities of the RGB channels. According to such an approach, three separate functions are each evaluated according to u and v as determined by the same surface normal vector, S, and the same illumination vector, L. Generally, it is advantageous to cause the chromaticity to remain independent of u and v, because this approach reduces the computational complexity of the algorithm.

PTM textures (as well as other texture mapping techniques) may be utilized for any number of applications. PTM textures may be utilized to render three-dimensional objects on two-dimensional computer screens with a relatively high degree of realism. For example, a stucco PTM texture may be created. The stucco PTM texture may be wrapped onto a three-dimensional object representing a house by an architectural software application. Various lighting conditions may be applied to the house so that a consumer may decide whether to pursue home renovations. Further details regarding the use of PTM textures in connection with three-dimensional mapping techniques are disclosed in U.S. patent application Ser. No. 09/921,477, entitled "SYSTEM AND METHOD FOR RENDERING A TEXTURE MAP UTILIZING AN ILLUMINATION MODULATION VALUE."

Although PTM textures were primarily developed for three-dimensional texture mapping applications, PTM textures are not limited to three-dimensional applications. For example, PTM textures may be utilized to perform image enhancement. PTM textures may also be utilized to interactively control lighting conditions to promote increased perception of surface characteristics. As one example, PTM may be utilized to provide an efficient method for rendering graphical objects with surface reflectance properties (e.g., which may be defined by a Bidirectional Reflectance Distribution Function), such as disclosed in concurrently filed and commonly assigned U.S. patent application Ser. No. 09/921,681, entitled "SYSTEM AND METHOD FOR RENDERING DIGITAL IMAGES HAVING SURFACE REFLECTANCE PROPERTIES."

It shall be appreciated that PTM provides appreciable advantages over other graphics rendering techniques. In particular, PTM textures provide the capability of representing a broad range of optical effects. PTM textures allow perception of self-shadowing and interreflections. PTM textures allow construction of images utilizing ansiotropic and Frensel shading models, Moreover, PTM textures may be readily constructed from real world samples (e.g., photographs). Additionally, it shall be appreciated that the superior realism of PTM textures is achieved with reasonable computational requirements.

It is often desirable to synthesize tileable PTM textures (or other types of textures) from relatively small sample textures. Such tileable textures allows applications to use less texture memory. For example, video processing cards utilized on personal computers may perform graphical operations with textures, such as PTM textures. However, the local memory of the video processing cards is typically limited. Accordingly, synthesizing sample textures to desired tileable textures (e.g., of a different size than the sample texture) allows video processing cards to store a greater number of small sample textures, such as small PTM sample textures. By storing greater numbers of sample textures, video processing cards are capable of producing greater numbers of imaging effects. It is then desirable to generate a tileable texture of a desired size from such small sample textures. For example, it is often desirable to generate a larger, tileable texture from a sample texture. For instance, in some implementations, video processing cards may be capable of generating such a larger, tileable texture from a sample texture stored in its local memory. Texture synthesis is a process for creating a new texture of a selected size from a sample texture of a fixed size.

As described above, preferred embodiments of the present invention utilize PTM textures. More specifically, preferred embodiments of the present invention provide algorithms for synthesizing PTM textures that have features arranged according to an underlying structure that is desired to be maintained in the resulting synthesized texture. While various types of synthesis techniques may be utilized in conjunction with embodiments of the present invention, certain embodiments are similar to the Wei and Levoy algorithm in that a neighborhood comparison approach is utilized. However, such embodiments of the present invention improve upon the Wei and Levoy algorithm to enable generation of a synthesized texture that maintains graphical features arranged according to an underlying structure as in the sample texture from which the synthesized texture is generated.

Further, preferred embodiments of the present invention differ from the Wei and Levoy algorithm in several pertinent respects due to the unique characteristics of PTM textures. For example, it shall be appreciated that the representation of the visual information in a PTM texture is significantly different from the representation of visual information in the textures described in the Wei and Levoy article discussed above. Specifically, the textures synthesized in the Wei and Levoy article do not vary as a function of incident light direction. The comparison of neighborhoods relies on this simple representation of visual information. Accordingly, it is not possible to simply provide a PTM texture as the input texture in the Wei and Levoy synthesis algorithm to generate a synthesized PTM texture. An example of a PTM texture synthesis process that utilizes a neighborhood comparison approach is described in greater detail in concurrently filed and commonly assigned U.S. patent application Ser. No. 10/683,196, entitled "SYSTEM AND METHOD FOR SYNTHESIS OF PARAMETRIC TEXTURE MAP TEXTURES."

Figure 4:
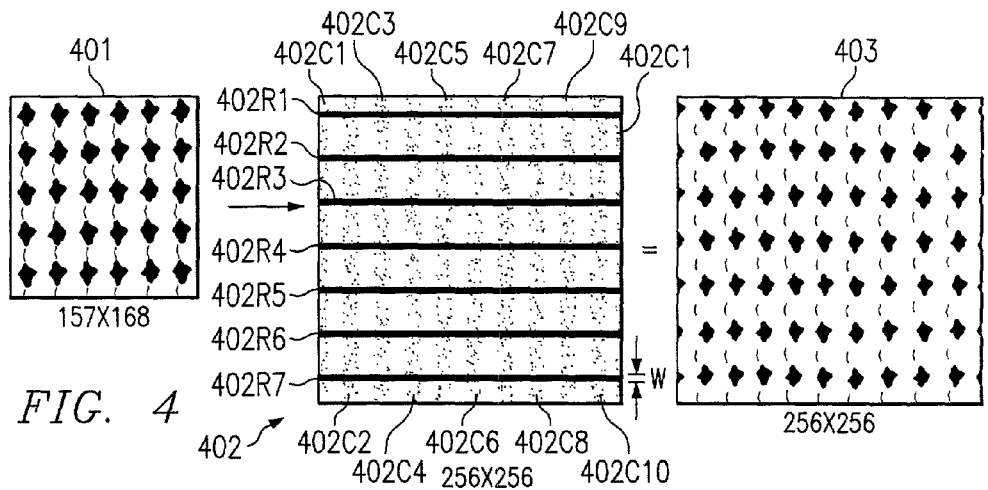
FIG. 4 depicts the use of constant values within a noise texture for synthesizing a texture according to one embodiment of the present invention.

Turning to FIG. 4, an example of one embodiment of the present invention is shown. In the example illustrated in FIG. 4 constant values are utilized within a noise texture to represent an underlying structure according to which graphical features (e.g., diamonds or other objects) of a sample texture are arranged to enable a synthesis process to generate a synthesized texture that includes such graphical features arranged according to such structure.

As shown in the example of FIG. 4, a sample texture 401 (which may also be referred to herein as a source texture) is provided having a first size, which is generally relatively small. For instance, in the example of FIG. 4, sample texture 401 has size 157 texels by 168 texels. Suppose that a user desires to generate a texture consistent with sample texture 401, but having a different size than sample texture 401 (e.g., having a larger size). A texture synthesis process may be utilized to generate the desired texture. For instance, in the example of FIG. 4, a texture having size 256 texels by 256 texels is desired. Thus, an intermediate "noise texture" 402 having the desired size (256×256 in this example) may be created for use in synthesizing the larger texture.

Noise texture 402 may be initialized with random noise, much as described in the Wei and Levoy synthesis process. However, in accordance with one embodiment of the present invention, constant values may be included within noise texture 402 to aid in maintaining a desired arrangement of features of sample texture 401. For instance, in the example of FIG. 4, noise texture 402 includes constant values that define rows 402R1–402R7. Additionally, as shown in the example of FIG. 4, constant values may be provided to define columns, such as columns 402C1–402C10. Thus, in the example of FIG. 4, ten columns are defined, with column 402C1 being wrapped around the right and left edges of noise texture 402.

According to a preferred embodiment, the constant values are chosen randomly, but arranged to represent an underlying structure for graphical features. Thus, the constant values are arranged in noise texture 402 to substantially match the frequency of the graphical features (e.g., diamonds). The resulting noise grid of noise texture 402 influences the pattern matching process (performed in the synthesis process) to enable the synthesis process to choose a common initial choice at regular intervals. Such common choice may be the graphical feature itself (e.g., a diamond) or the common choice may be area between the graphical features. As with the Wei and Levoy synthesis process, according to a preferred embodiment, the noise values are used only along the bottom and left edges. In the interior, only texels that have been previously processed are considered in the matching process.

Figure 9A:
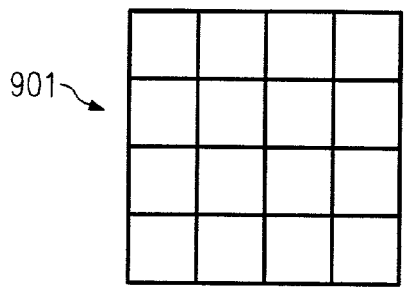
FIGS. 9A–9D depict various exemplary structures according to which features of a texture may be arranged and maintained in a resulting synthesized texture in accordance with embodiments of the present invention.
Figure 9B:
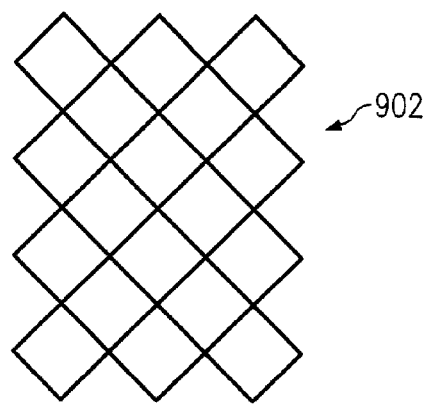
Figure 9C:
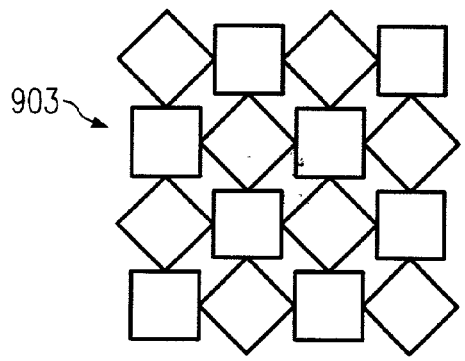

In certain embodiments, constant values may be utilized to define rows, columns, or both, according to which features (e.g., diamonds or other objects) are to be arranged in the resulting synthesized texture 403. Furthermore, constant values may be included in noise texture 402 to define structures other than rows and columns according to which graphical features are to be arranged, such as the exemplary structures described hereafter in conjunction with FIGS. 9B–9D.

As described above, the constant values included within noise texture 402 work to temper the randomness of the resulting synthesized texture 403 by aiding the synthesis process in maintaining a desired underlying structure (or arrangement) of a graphical feature of sample texture 401. More specifically, in the example of FIG. 4, sample texture 401 comprises diamonds that are arranged according to a particular structure. For instance, such diamonds are arranged symmetrically in relatively straight rows and columns in sample texture 401. Noise texture 402 includes constant values that identify rows 402R1–402R7 and/or 402C1–402C10 to aid resulting synthesized texture 403 in maintaining the desired structure. More specifically, rows 402R1–402R7 identify the rows in which the diamonds are to be arranged in resulting synthesized texture 403, and columns 402C1–402C10 identify columns in which the diamonds are to be arranged in resulting synthesized texture 403. Accordingly, the randomness of noise texture 402 may be tempered or limited by the inclusion of constant values therein, which aid in achieving/maintaining a desired structure in which graphical features (e.g., diamonds or other objects) are to be arranged in resulting synthesized texture 403.

As an example of a preferred embodiment, sample texture 401 may be a PTM texture having a first size (157×168 texels in the example of FIG. 4). A user (or computer-executable application) may desire to generate a new texture of a different size (256×256 texels in the example of FIG. 4), and may desire to maintain the structure (or pattern) according to which the diamonds of sample texture 401 are arranged. A preferred embodiment enables texture synthesis to be performed using such PTM textures. For example, the technique described more fully in concurrently filed and commonly assigned U.S. patent application Ser. No. 10/683,196, entitled "SYSTEM AND METHOD FOR SYNTHESIS OF PARAMETRIC TEXTURE MAP TEXTURES" may be utilized to perform texture synthesis for PTM textures.

A command line interface (or other type of user interface) may be available to enable a user (or an application) to generate a desired synthesized texture. As an example, the following command line utility may be executed: "PTM_Tileing.exe -IN input.ptm -OUT output.ptm -SIZE 256 256 -NEIGHBORHOOD 15 -LAYERS 4". In this example, the "PTM_Tileing.exe" utility may be executed to perform texture synthesis in accordance with the arguments (or options) specified therewith. For instance, command line options "-IN <filename.ptm>" and "-OUT <filename.ptm>" may designate the input PTM filename and an output PTM filename, respectively, to be used by the texture synthesis process. Thus, in the above example, "-IN input.ptm -OUT output.ptm" designate that the file "input.ptm" is the input PTM (e.g., sample texture file) to be used in the texture synthesis process and the file "output.ptm" is the filename given to the resulting synthesized texture output by the texture synthesis process. The command line option "-SIZE <+integer> <+integer>" specifies the dimensions of the output PTM. Thus, in the above example, "-SIZE 256 256" specifies that the dimensions of the output PTM texture is to be 256×256. The command line options "-NEIGHBORHOOD <(odd)+integer>" and "-LAYERS <+integer>" are used to control the size of the neighborhood and number of Gaussian pyramid layers to be used in the pattern matching operation. In general, larger features in an input PTM may require a larger neighborhood size and/or more pyramid layers if such features are to be preserved in the output PTM. In the above example, "-NEIGHBORHOOD 15 -LAYERS 4" specifies that the neighborhood size is 15, and 4 Gaussian pyramid layers are to be used in the pattern matching operation. Accordingly, in certain embodiments, multi-resolution may be used in the texture synthesis process.

In a preferred embodiment, texture synthesis processing begins by initializing the output PTM with texels selected randomly from the input PTM. That is, the output texture may be initialized with "noise" selected randomly from the input texture. At this point, the output texture may be referred to as a "noise texture" (e.g., noise texture 402 in FIG. 4) as it contains random noise. While in some embodiments the noise texture may be initialized with completely random noise, in certain embodiments the randomness of the noise is tempered somewhat by initializing the noise texture with texels selected randomly from the input texture. Thus, the noise texels may be limited to having only texels that are present in the input texture.

Additionally, the randomness of the noise texture may further be tempered by including constant values arranged therein. For instance, in one embodiment, a command line utility, such as the "PTM_Tileing.exe" utility described above, may be executed with options that temper the randomness of the noise initialized in the output texture. For example, such command line utility may include at least one "GRID" option, such as "-GRIDX" and "-GRIDY," which may be used to alter the randomness of the initial output texture (e.g., output PTM). In the output image of FIG. 2, a texture synthesis process of the prior art produced output texture 203 in which the diamond features are arranged with a slanted row 203A and an arched row 203B, rather than in a relatively straight line as the underlying structure of sample texture 201 defines. The GRID options may be used to influence this characteristic in the output.

As described above, the texels used for the row and column grid lines of an output texture are initially chosen randomly (e.g., from texels present in the input texture). Constant values may be included within the noise texture to aid in achieving/maintaining a desired structure according to which features (e.g., diamonds or other objects) are arranged. Suppose, for example, that the options "-GRIDX 10 -GRIDY 7 -GRIDWIDTH 10" are utilized with the above-described $PTM_{13}$ Tileing.exe utility; such options specify that the noise texture is to have 10 columns (i.e., 10 columns provided across the width "X" of the noise texture), and 7 rows (i.e., 7 rows provided along the height "Y" of the noise texture). Thus, constant values may be arranged in the noise texture to provide for 10 columns, such as columns 402C1–402C10 in the example of FIG. 4, and 7 rows, such as rows 402R1–402R7 in the example of FIG. 4. The "-GRIDWIDTH" option further designates the width of each of the rows of constant values, which is shown as "W" in the example of FIG. 4. Thus, GRIDX and GRIDY determine how often to influence the algorithm, while GRIDWIDTH determines how much influence to provide. For instance, the larger the width of each row, the larger the influence that the constant values have on the neighborhood comparison during synthesis.

While a user may dictate the constant values to be input into the noise texture in certain embodiments (e.g., via a command line interface), in other embodiments a software program may be executed to dictate the arrangement of constant values to be provided in the noise texture. For instance, a software program may be implemented to evaluate a sample texture and identify an underlying structure of graphical features that is to be maintained in the synthesized texture, and the software program may interpolate such structure of the sample to determine an appropriate arrangement of constant values to represent such structure in the synthesized texture. For example, the software program may interpolate an underlying structure of a given number of rows/columns provided in a sample texture of size X to a particular number of rows/columns that should be included in a desired texture of size Y to maintain the underlying structure, and the software program may provide the noise texture with constant values representing the particular number of rows/columns for maintaining the underlying structure in the synthesized texture of size Y.

Turning now to FIG. 5, an exemplary operational flow diagram 500 for one embodiment of the present invention is shown, In this example, a sample texture data structure (e.g., a PTM matrix or RGB matrix), which may also be referred to as a source texture or an input texture, is received by the texture synthesis process at operational block 501. For instance, in one implementation, a command line utility for performing texture synthesis (e.g., PTM_Tileing.exe) may be executed with an argument that identifies the input texture sample to be used. In operational block 502, a desired size for an output texture (or "resulting synthesized texture") is received by the texture synthesis process. For instance, in one implementation, the command line utility for performing texture synthesis may be executed with an argument that specifies the desired size of an output texture. The texture synthesis process may then, in block 503, create a new texture data structure (e.g., a new RGB matrix) having the desired size. The new texture data structure may be initialized with random noise in block 504, which may, in certain embodiments, include texels selected randomly from the sample texture data structure.

In operational block 505, constant values may be applied in the new texture (e.g., the noise texture) to influence the synthesis process to arrange graphical features in the resulting synthesized texture according to a desired underlying structure. As an example, the command line utility for performing texture synthesis may be executed with argument(s) that specify an arrangement of constant values to be utilized in the noise texture. For instance, constant values may be used to define a number of rows and/or columns according to which graphical features (e.g., diamonds or other graphical objects) are to be arranged in the resulting synthesized texture. The chosen grid of constant values provided in the noise texture preferably corresponds to the frequency of graphical features.

Starting in operational block 506, the synthesis process proceeds to generate a resulting synthesized texture, preferably utilizing a neighborhood comparison approach. Thus, in block 506, the process examines the first pixel (preferably in raster scan order) of the new texture data structure to be synthesized. In block 507, the pixel's neighborhood is determined. As described above, in certain embodiments, the neighborhood size may be specified by a command line argument. In block 508, the synthesis process executes to compare the pixel to each pixel of the sample texture to determine a color value of the sample texture that has a neighborhood that most closely matches the neighborhood of the pixel to be synthesized. In block 509, the pixel of the new texture data structure is set to the color value determined in block 508. The constant values included in the noise texture influence the pattern matching algorithm to make a similar initial choice at the beginning of an underlying structure (e.g., at the beginning of rows and columns) according to which graphical features are arranged. Thus, the constant values arranged in the noise texture represent a desired underlying structure according to which graphical features of a synthesized texture are to substantially conform.

In block 510, a determination is made as to whether more pixels exist in the new texture data structure that need to be synthesized. If more pixels do exist, then the next pixel (preferably in raster scan order) of the new texture data structure is examined, and operation returns to block 507 to synthesize such pixel in the manner described above for the first pixel. Operation continues until it is determined in block 510 that no further pixels exist in the new texture to be synthesized, at which point operation may end in block 512.

It should be understood that while only one pass through the new texture is implemented in the example of FIG. 5, embodiments of the present invention may be implemented to enable multi-resolution of the new texture. For instance, Gaussian pyramids, other pyramids, or other multi-resolution data structures may be utilized in the texture synthesis process. For example, the texture synthesis algorithm may be operable to transform a noise Gaussian pyramid from lower to higher resolutions. As described above, the number of resolution data structures (or number of Gaussian pyramid layers) to be used in the pattern matching operation may, in certain embodiments, be specified by an argument included within the command line utility that executes the texture synthesis process. The resulting synthesized texture generated from the process of FIG. 5 (e.g., texture 403 of FIG. 4) comprises a texture of a desired size that is preferably tileable, and that also maintains graphical features arranged according to a desired structure.

As those of ordinary skill in the art will appreciate, computer graphics Application Programming Interfaces (APIs), such as OpenGL, typically recognize a performance improvement in texturing operation when the textures have dimensions that are a power of 2 (e.g., 2, 4, 8, 16, 32, . . . , etcetera). Some APIs even restrict textures to powers of 2. It is therefore often desirable to generate tileable textures that are powers of 2. However, the underlying structure in an input (or sample) texture may have features that do not repeat uniformly on power of 2 boundaries. According to one embodiment of the present invention, an output size (e.g., size of a resulting synthesized texture) may be selected that does allow for a uniform number of repeats, and then such output texture may be resized to a texture having a size that is a power of 2. That is, in certain embodiments, an intermediate synthesized texture may be generated that is not a power of 2 that enables the underlying structure to more accurately be maintained (e.g., enables a uniform repeating pattern of graphical features), and such intermediate synthesized texture may then be resized to the resulting texture having the desired size that is a power of 2.

In general, PTMs also expect texture dimensions to be a power of 2. Suppose that a source PTM includes a repeating pattern of features, and further suppose that such repeating pattern is desired to be maintained in the synthesized result. However, suppose the width and height of the repeating pattern does not divide evenly into powers of 2. It may be desirable to have the texture synthesis process compensate for such characteristic of the repeating pattern in a manner that produces a desired resulting synthesized texture (having a size that is a power of 2). At least one embodiment of the present invention further enables a desired synthesized texture to be generated from a sample texture that has a repeating pattern with a size that does not divide evenly into powers of 2. More specifically, the synthesis process may first generate an intermediate texture having the repeating pattern maintained therein. Such intermediate texture may be nearly the size desired for the resulting texture, but may be a size that is not a power of 2. Thereafter, the intermediate texture may be resized to result in a texture having the desired size that is a power of 2 with the repeating pattern of features maintained therein.

Figure 6:
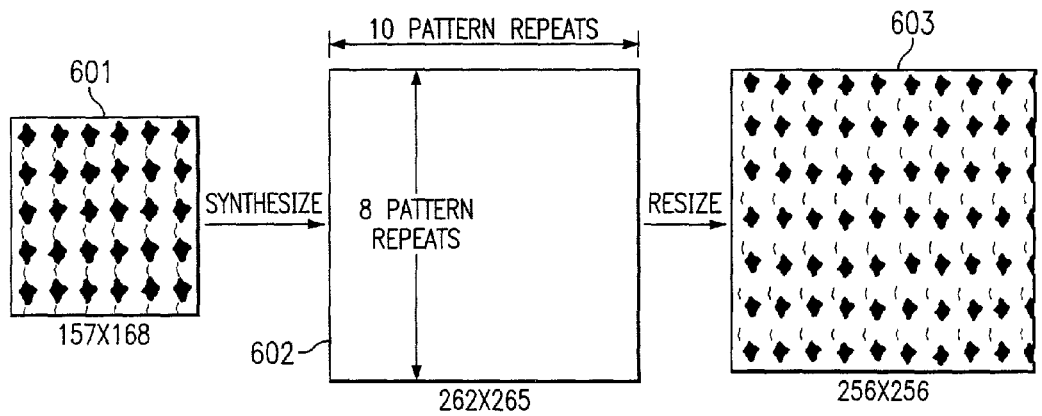
FIG. 6 depicts an exemplary operational flow for texture synthesis in accordance with another embodiment of the present invention that utilizes an intermediate synthesized texture.

Turning to FIG. 6, an example of one embodiment of the present invention is shown. In the example of FIG. 6, source texture 601 has size 157×168. Source texture 601 includes 6 pattern repeats (of diamonds) along its width (e.g., includes 6 columns of diamonds) and 5 pattern repeats along its height (e.g., includes 5 rows). On average, one instance of the repeating pattern (or one diamond) is 26.2 texels wide and 33.6 texels high. Suppose an output texture of size 256×256 is desired, which is a power of 2 (i.e., $2^8$). However, suppose that a texture having a size that is not a power of 2 enables a better recreation of the desired pattern.

For instance, in this example, a texture of size 262×265 would allow for 10 uniform pattern repeats in width and 8 uniform pattern repeats in height, but 262 and 265 are not powers of 2. Thus, the resulting synthesized texture having size 262×265 could not be used in many computer graphics APIs, such as openGL.

However, one embodiment of the present invention enables such texture having a size that is not a power of 2 to be generated and then resized to a texture size that is a power of 2. For instance, in this example, a command line utility (e.g., PTM_Tileing.exe) may be executed as described above, but with options "-SIZE 262 265", "-GRIDX 10", and "-GRIDY 8". Additionally, an option of "-RESIZE 256 256" may be included to specify that the texture generated having size 262×265 is to be resized to result in a texture having size 256×256. This will generate an intermediate texture 602 (e.g., an intermediate PTM) that is 262×265 in size, which allows 10 uniform pattern repeats in width and 8 uniform pattern repeats in height. The synthesis process then resizes intermediate texture 602 to generate an output texture 603 (e.g., an output PTM) that is 256×256.

It should be noted that even though the option "-GRIDY 8" is used in the example of FIG. 6, only 7 pattern repeats along the height appear in the resulting output texture 603. This illustrates that there may still exist randomness in the texture synthesis process. That is, in a preferred embodiment, the GRID options are only an attempt to influence the result, and do not force a certain outcome. Of course, by varying the width of the rows of constant values provided in the noise texture, such constant values may have a greater influence, which may result in a synthesized texture having 8 rows of pattern repeats.

Figure 7:
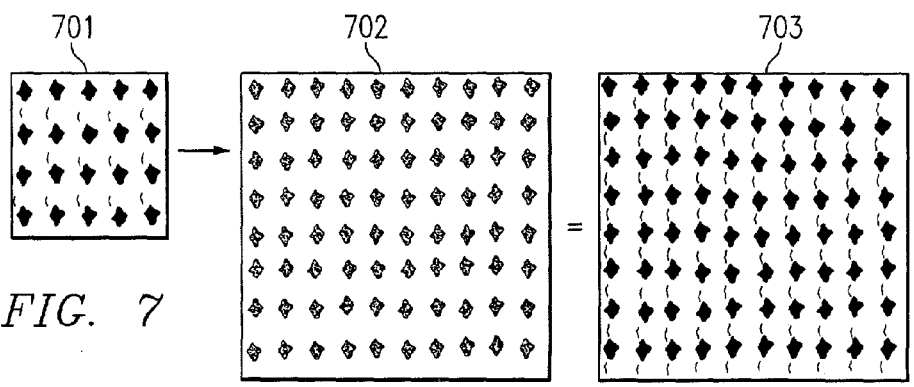
FIG. 7 depicts the use of a noise texture that is very nearly the desired result for synthesizing a texture according to yet another embodiment of the present invention.

Turning now to FIG. 7, an example of another embodiment of the present invention is shown. In the example illustrated in FIG. 7, rather than using a randomly generated noise texture in the texture synthesis process, a noise texture that is nearly the desired result is utilized to enable the synthesis process to generate an output texture that includes graphical features arranged according to a desired structure. As shown in the example of FIG. 7, a sample texture 701 is provided having a first size, which is generally relatively small. For instance, in the example of FIG. 7, sample texture 701 may have a size of 157×168.

Suppose that a user desires to generate a texture consistent with sample texture 701, but having a different size than sample texture 701 (e.g., having a larger size, such as size 256×256). A texture synthesis process may be utilized to generate the desired texture. Thus, a "noise texture" 702 having the desired size (e.g., 256×256), which is nearly the desired result, (e.g., which identifies the desired structure according to which graphical features are to be arranged in the output texture) but which is not tileable may be utilized. Utilizing noise texture 702, which is nearly the desired result, aids in maintaining a desired arrangement of graphical features of sample texture 701.

As an example of a preferred embodiment, sample texture 701 may be a PTM texture having a first size (e.g., 157× 168). A user (or application) may desire to generate a new texture of a different size (e.g., 256×256), and may desire to maintain the structure (or pattern) according to which the diamonds of sample texture 701 are arranged. A preferred embodiment enables texture synthesis to be performed using such PTM textures. Further, as described above, a command line interface (or other type of user interface) may be available to enable a user (or an application) to generate a desired synthesized texture (e.g., utilizing the PTM_Tileing.exe utility described above).

In one embodiment of the present invention, an option may be included within the command line utility to specify a noise texture to utilize in the texture synthesis process. For example, instead of using a randomly generated noise texture in the texture synthesis processing, options, such as "-NOISEPTM" and "-NOISE," may be included within the command line utility to specify a texture to use as the initial starting point for the noise texture. For instance, the option "-NOISEPTM <filename.ptm>" may be used to specify the texture file (e.g., PTM) to use as the noise image. Such file may be nearly the desired result, but may not be tileable.

The file to be used as a noise texture having nearly the desired result may be created/obtained in several different ways. As one example, the file may be created by tileing the sample texture therein. While the sample texture is not readily tileable with sufficient quality desired for the resulting synthesized texture, it may be tiled to create a noise texture that is nearly the desired result (e.g., has the desired underlying structure, but is not tileable). As another example, such file may be created/obtained in the same manner that the sample (or input) texture is created/obtained. For instance, the file may be a large sample of a texture obtained photographically. A relatively small area of such large sample may be extracted and used as the sample (or input) texture. A relatively larger sample may be extracted from the file, and such larger sample may have a whole number of pattern repeats in both the X and Y dimensions. Such relatively larger sample extracted from the file may be used as the noise in the texture synthesis process (e.g., may be used as the noise texture). Such relatively larger sample preferably is not used as is because it does not have all of the detailed requirements of a tileable texture. For instance, while it has a whole number of features in the X and Y dimensions, the left edge will not blend nicely with the right edge and the bottom edge will not blend nicely with the top edge.

According to at least one embodiment, the noise file may be randomized, and such randomness may be controlled (or tempered) by use of "-NOISE <[0..1]>" option. The "-NOISE" option specifies how much to randomize the noise file. For example, a value of 0 specifies no randomization of the noise file, while a value of 1 specifies full randomization of the noise file.

Using a specified noise texture file 702 that has nearly the desired result (e.g., that specifies a desired arrangement of graphical features therein), may be used in the synthesis process to generate a resulting synthesized texture 703 that is tileable and that maintains the desired arrangement of graphical features (e.g., diamonds). The values included within noise texture 702 work to temper the randomness of the resulting synthesized texture 703 by aiding the synthesis process in maintaining a desired geometric structure (or arrangement) of a feature of sample texture 701. It should be noted that the resulting synthesized texture 703 may not be better than the resulting texture 403 achieved in the embodiment of FIG. 4 or the resulting texture 603 achieved in the embodiment of FIG. 6. However, if maintaining a more exact width to height ratio in the repeating pattern is important, use of noise texture file 702 may be preferable. For example, the resulting synthesized texture 703 has 8 pattern rows (as defined in noise texture 702), whereas the result in FIG. 6 has 7.

Turning now to FIG. 8, an exemplary operational flow diagram 800 for one embodiment of the present invention is shown. In this example, a sample texture data structure (e.g., a PTM matrix or RGB matrix), which may also be referred to as a source texture or an input texture, is received by the texture synthesis process at operational block 801. For instance, in one implementation, a command line utility for performing texture synthesis (e.g., PTM_Tileing.exe) may be executed with an argument that identifies the input texture sample to be used. In operational block 802, a desired size for an output texture (or "resulting synthesized texture") is received by the texture synthesis process. For instance, in one implementation, the command line utility for performing texture synthesis may be executed with an argument that specifies the desired size of an output texture. The texture synthesis process may then, in block 803, determine a noise texture file that is nearly the desired result. For instance, a noise texture file may be specified as an argument within a command line utility for performing texture synthesis, and such noise texture file may include values therein that indicate a desired arrangement of graphical features (e.g., diamonds or other objects), but that is not tileable.

In operational block 804, the texture synthesis process creates a new texture data structure (e.g., a new PTM matrix or RGB matrix) having the desired size. The new texture data structure may be initialized in block 805 with noise from the noise texture file determined in block 803. Such noise may be randomized to a degree, which may, in certain embodiments, be specified as an argument to the command line utility (e.g., the "-NOISE" argument). For example, operational block 805A may be executed in certain implementations to randomize the New_Texture data structure to a degree, as may be specified by a user.

Starting in operational block 806, the synthesis process proceeds to generate a resulting synthesized texture, preferably utilizing a neighborhood comparison approach. Thus, in block 806, the process examines the first pixel (preferably in raster scan order) of the new texture data structure to be synthesized. In block 807, the pixel's neighborhood is determined. As described above, in certain embodiments, the neighborhood size may be specified by a command line argument. In block 808, the synthesis process executes to compare the pixel to each pixel of the sample texture to determine a color value of the sample texture that has a neighborhood that most closely matches the neighborhood of the pixel to be synthesized. In block 809, the pixel of the new texture data structure is set to the color value determined in block 808. The noise texture initialized to the values of the noise texture file (e.g., initialized to values extracted from the noise texture file) influences the initial choices of the pattern matching process at the left edge and bottom edge of the synthesized texture, much in the same manner as described above for the embodiments that utilize constant values in the noise texture. Thus, the values initialized in the noise texture from the noise texture file include values that represent a desired underlying structure according to which graphical features of a synthesized texture are to substantially conform.

In block 810, a determination is made as to whether more pixels exist in the new texture data structure that need to be synthesized. If more pixels do exist, then the next pixel (preferably in raster scan order) of the new texture data structure is examined, and operation returns to block 807 to synthesize such pixel in the manner described above for the first pixel. Operation continues until it is determined in block 810 that no further pixels exist in the new texture to be synthesized, at which point operation may end in block 812.

As with the exemplary flow diagram of FIG. 5, it should be understood that while only one pass through the new texture is implemented in the example of FIG. 8, embodiments of the present invention may be implemented to enable multi-resolution of the new texture. For instance, Gaussian pyramids, other pyramids, or other multi-resolution data structures may be utilized in the texture synthesis process. For example, the texture synthesis algorithm may be operable to transform a noise Gaussian pyramid from lower to higher resolutions. As described above, the number of resolution data structures (or number of Gaussian pyramid layers) to be used in the pattern matching operation may, in certain embodiments, be specified by an argument included within the command line utility that executes the texture synthesis process. The resulting synthesized texture generated from the process of FIG. 8 (e.g., texture 703 of FIG. 7) comprises a texture of a desired size that is preferably tileable, and that also maintains features arranged according to an underlying desired structure.

Figure 9D:
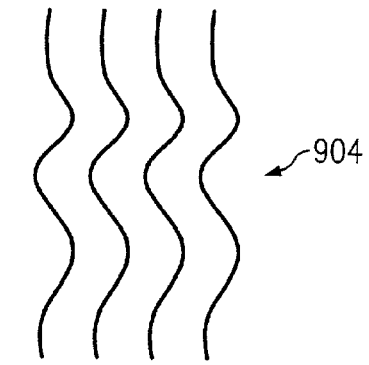

It should be understood that graphical features may be arranged according to any number of underlying structures. Various examples of such structures according to which features may be arranged are illustrated in FIGS. 9A–9D. For instance, graphical features may be arranged in a texture according to columns and rows, as described in the above examples and shown as structure 901 of FIG. 9A. As another example, graphical features may be arranged within a texture according to structure 902 of FIG. 9B. As yet another example, graphical features may be arranged within a texture according to structure 903 of FIG. 9C. FIG. 9D provides still another example of a structure 904 according to which graphical features may be arranged within a texture. Many other structures/arrangements of graphical features may be implemented within a texture, including as examples arrangements commonly implemented in fabrics and tiles (e.g., floor tiling), and any such structure according to which graphical features may be arranged in a texture is intended to be within the scope of the present invention. As described above, various embodiments of the present invention enable a resulting synthesized texture that is tileable to be generated, while maintaining the arrangement of graphical features in accordance with a structure as defined in the sample texture. The resulting synthesized texture may then be utilized for any number of applications as desired by the user.

When implemented via executable instructions, various elements of the present invention are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 10:
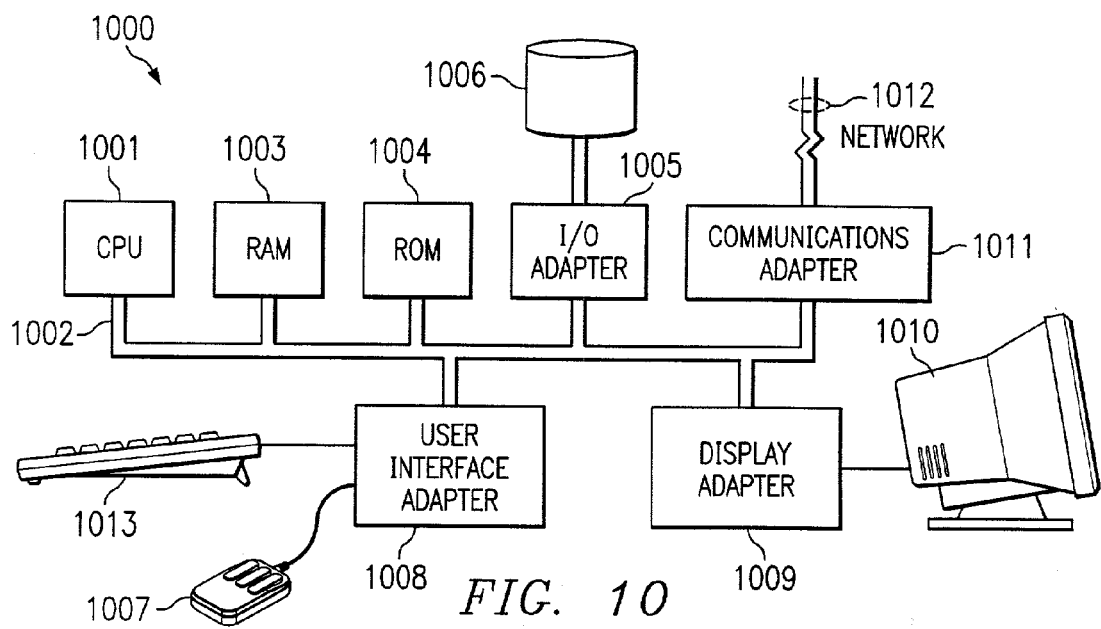
FIG. 10 depicts an exemplary computer system on which embodiments of the present invention may be implemented.

FIG. 10 illustrates computer system 1000 adapted according to embodiments of the present invention. Central processing unit (CPU) 1001 is coupled to system bus 1002. CPU 1001 may be any general purpose CPU. Suitable processors, without limitation, include any processor from the Itanium™ family of processors or an PA-8500 processor also available from Hewlett-Packard Company. However, the present invention is not restricted by the architecture of CPU 1001 as long as CPU 1001 supports the inventive operations as described herein. CPU 1001 may execute the various logical instructions according to embodiments of the present invention. For example, CPU 1001 may execute machine-level instructions according to the exemplary operational flows described above in conjunction with FIGS. 5 and 8.

Computer system 1000 also preferably includes random access memory (RAM) 1003, which may be SRAM, DRAM, SDRAM, or the like. Computer system 1000 may utilize RAM 1003 to store the various data structures used in PTM texture synthesis, such as the sample texture and the noise texture. Computer system 1000 preferably includes ROM 1004 which may be PROM, EPROM, EEPROM, or the like. RAM 1003 and ROM 1004 hold user and system data and programs as is well known in the art.

Computer system 1000 also preferably includes input/output (I/O) adapter 1005, communications adapter 1011, user interface adapter 1008, and display adapter 1009. I/O adapter 1005 and/or user interface adapter 1008 may, in certain embodiments, enable a user to interact with computer system 1000 in order to input information for generating texture synthesis in a desired manner, such as inputting the command line commands described above. In alternative embodiments, display adapter 1009 may perform various logical steps associated with PTM texture synthesis. For example, display adapter 1009 may comprise logical instructions or logic elements (e.g., logic gates) which implement the operations of the exemplary operational flows described above in conjunction with FIGS. 5 and 8.

I/O adapter 1005 preferably connects to storage devices 1006, such as one or more of hard drive, CD drive, floppy disk drive, tape drive, to computer system 1000. The storage devices may be utilized when RAM 1003 is insufficient for the memory requirements associated with synthesis of large PTM textures. Communications adapter 1011 is preferably adapted to couple computer system 1000 to network 1012, which may be one or more of telephone network, local (LAN) and/or wide-area (WAN) network, and/or Internet network. User interface adapter 1008 couples user input devices, such as keyboard 1013 and pointing device 1007, to computer system 1000. Display adapter 1009 is driven by CPU 1001 to control the display on display device 1010.

It shall be appreciated that the present invention is not limited to the architecture of system 1000. For example, any suitable processor-based device may be utilized including without limitation personal data assistants (PDAs), computer game consoles, and multi-processor servers. Moreover, embodiments of the present invention may be implemented on application specific integrated circuits (ASIC) or very large scale integrated (VLSI) circuits. In fact, persons of ordinary skill in the art may utilize any number of suitable structures capable of executing logical operations according to the embodiments of the present invention.

It shall also be appreciated that embodiments of the present invention preferably utilize a synthesis process that uses a neighborhood comparison approach for pattern matching, similar to the neighborhood comparison approach of Wei and Levoy. Of course, any suitable synthesis process now known or later discovered which make use of such a neighborhood comparison approach may be utilized in accordance with various embodiments of the present invention. As described above, the Wei and Levoy synthesis process utilizes a degree of randomness to achieve a highly tileable result. Embodiments of the present invention also provide a synthesis process that utilizes a degree of randomness to achieve a highly tileable result, but such synthesis process also includes a degree of structure (e.g., within the noise texture utilized) to enable the resulting synthesized texture to maintain an underlying structure, as desired. If too much structure is included in the synthesis process (e.g., within the noise texture), the tileable characteristics of the resulting synthesized texture may suffer. Thus, embodiments of the present invention enable a certain amount of structure to be applied within the synthesis process to maintain an underlying structure of graphical features in a resulting synthesized texture, while also providing a degree of randomness to enable the resulting synthesized texture to have good tileable characteristics.

A preferred embodiment is implemented using a PTM texture format. However, other embodiments may be implemented utilizing any type of texture mapping format now known or later discovered, including as examples RGB, red-green-blue-alpha (RBGA), color index, luminance, and luminance alpha formats.

Embodiments of the present invention provide appreciable advantages over known texture synthesis algorithms. Specifically, the textures synthesized by embodiments of the present invention enable a desired arrangement of graphical features to be maintained in a resulting synthesized texture. That is, embodiments of the present invention enable the randomness of the synthesis process to be controlled (e.g., tempered) in order to maintain graphical features arranged in accordance with an underlying structure (e.g., a geometric structure or pattern) as defined in the sample texture, while also enabling sufficient randomness in the synthesis process for creating a resulting synthesized texture that is tileable.

What is claimed is:

1. A method for synthesizing a texture of a desired size from a sample texture, said method comprising:

generating a matrix of said desired size;

providing values to said matrix, wherein said values comprise random values and wherein at least a portion of said values represent a desired structure according to which graphical features of a synthesized texture are to substantially conform; and executing a texture synthesis process that utilizes said matrix to generate a synthesized texture of said desired size having graphical features arranged therein substantially in conformance with said desired structure.

2. The method of claim 1 wherein said providing comprises:

providing constant values to said matrix that represent said desired structure.

3. The method of claim 1 wherein said providing comprises:

providing constant values to said matrix that are arranged therein to represent said desired structure.

4. The method of claim 1 wherein said providing comprises:

populating said matrix with values from a pre-existing file.

5. The method of claim 4 further comprising:

randomizing said values from said pre-existing file.

6. The method of claim 5 wherein said randomizing further comprises:

randomizing said values from said pre-existing file to a user-specified degree.

7. The method of claim 4 wherein said values from said pre-existing file are nearly the desired result but are not tileable.

8. The method of claim 4 wherein said values from said pre-existing file include said at least a portion of values that represent said desired structure, but wherein said matrix having values from said pre-existing file is not readily tileable.

9. The method of claim 1 wherein said executing said texture synthesis process further comprises:

(a) selecting a value from said matrix;

(b) determining a first neighborhood of the selected value from said matrix; and (c) comparing said first neighborhood to neighborhoods of said sample texture to determine an optimal value of said sample texture.

10. The method of claim 9 further comprising:
(d) repeating (a)–(c) for each value of said matrix.

11. The method of claim 1 wherein said sample texture comprises a parametric texture map (PTM) texture.

12. The method of claim 11 wherein said providing comprises:
providing texel values to said matrix.

13. The method of claim 1 wherein said sample texture comprises a texture of a format selected from the group consisting of:
red-green-blue (RGB), red-green-blue-alpha (RGBA), color index, luminance, and luminance alpha.

14. The method of claim 1 wherein said providing comprises providing pixel values to said matrix.

15. The method of claim 1 further comprising re-sizing said synthesized texture.

16. The method of claim 1 wherein said desired size is not a power of 2, further comprising:
re-sizing said synthesized texture to a size that is a power of 2.

17. A system for generating a synthesized texture from a sample texture, said system comprising:
a first data structure defining said sample texture of a first plurality of values;
a second data structure defining a texture of a second plurality of values, wherein at least a portion of said values of said second data structure are random and wherein at least a portion of said values of said second data structure represent a desired structure according to which graphical features are to substantially conform; and
a texture synthesis algorithm, said texture synthesis algorithm being operable to utilize at least said first data structure and said second data structure to generate a synthesized texture having graphical features arranged therein in substantial conformance to said desired structure.

18. The system of claim 17 wherein said first data structure is of a first size and wherein said second data structure is of a second size.

19. The system of claim 17 wherein said at least a portion of said values of said second data structure comprises:
constant values arranged in said second data structure to represent said desired structure.

20. The system of claim 17 wherein said second data structure is populated with values from a pre-existing file comprising said at least a portion of said values that identify said desired structure.

21. The system of claim 17 wherein said sample texture comprises a parametric texture map (PTM) texture.

22. The system of claim 21 wherein said first plurality of values comprise texel values.

23. The system of claim 17 wherein said texture synthesis algorithm is operable to transform said second data structure into said synthesized texture.

24. The system of claim 23 wherein said second data structure has a size that is not a power of 2, and wherein said texture synthesis algorithm is further operable to re-size said synthesized texture to a size that is a power of 2.

25. The system of claim 17 wherein said texture synthesis algorithm is further operable to select a value from said second data structure, determine a first neighborhood of the selected value from said second data structure, compare said first neighborhood to neighborhoods of said first data structure to determine an optimal value of said first data structure, and assign said optimal value to the selected value of said second data structure.

26. The system of claim 17 wherein said texture synthesis algorithm is further operable to re-size said synthesized texture.

27. A system for synthesizing a texture of a desired size from a sample texture, said system comprising:
code for generating a matrix of said desired size;
code for initializing said matrix with a plurality of values, wherein at least a portion of said values are random and wherein at least a portion of said values represent a desired structure according to which graphical features are to be arranged; and
code for generating a synthesized texture of said desired size having graphical features arranged therein according to said desired structure.

28. The system of claim 27 wherein said code for initializing said matrix further comprises:
code for providing constant values to said matrix arranged therein to identify said desired structure.

29. The system of claim 27 wherein said code for initializing said matrix further comprises:
code for populating said matrix with values from a pre-existing file.

30. The system of claim 27 wherein said code for generating comprises:
code for transforming at least a portion of said values of said matrix such that said matrix defines said synthesized texture.

31. The system of claim 27 wherein said code for generating further comprises:
code for determining a first neighborhood of a selected value from said matrix;
code for comparing said first neighborhood to neighborhoods of said sample texture to determine an optimal value of said sample texture; and
code for assigning said optimal value of said sample texture to the selected value of said matrix.

* * * * *